(12) United States Patent
Lee

(10) Patent No.: US 8,195,696 B2
(45) Date of Patent: Jun. 5, 2012

(54) FILE FORMAT CONVERTING METHOD

(75) Inventor: Tsung-Yueh Lee, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 168 days.

(21) Appl. No.: 12/789,171

(22) Filed: May 27, 2010

(65) Prior Publication Data

US 2010/0306202 A1    Dec. 2, 2010

(30) Foreign Application Priority Data

Jun. 1, 2009    (TW) .............................. 98117965 A

(51) Int. Cl.
G06F 17/00    (2006.01)

(52) U.S. Cl. ......... 707/791; 707/802; 707/822; 707/828

(58) Field of Classification Search ........... 707/600–831
See application file for complete search history.

(56) References Cited

U.S. PATENT DOCUMENTS

2006/0083442 A1*   4/2006   Loukipoudis et al. ........ 382/305
* cited by examiner Primary Examiner — Isaac M Woo
(74) Attorney, Agent, or Firm — Han IP Law PLLC; Andy M. Han

(57) ABSTRACT

A file format converting method for converting a first format file in a first file system of a storage apparatus to a second format file in a second file system is provided. The method includes creating a temporary file and defining a data amount of the temporary file as a first predetermined value; defining a start position of the temporary file to be the same as that of the first format file; and defining the data amount of the temporary file to be the same as that of the first format file to generate the second format file.

14 Claims, 8 Drawing Sheets

FILE FORMAT CONVERTING METHOD

CROSS REFERENCE TO RELATED PATENT APPLICATIONS

This patent application claims priority from Taiwan Patent Application No. 098117965, filed in the Taiwan Patent Office on Jun. 1, 2009, entitled "File Format Converting Method", and incorporates the Taiwan patent application in its entirety by reference.

TECHNICAL FIELD

The present disclosure relates to a file format converting method, and more particularly, to a file format converting method for converting a file to a file format accessible to a file allocation table (FAT) system.

BACKGROUND OF THE PRESENT DISCLOSURE

In the prior art, an FAT system applied to a storage apparatus serves as a tool for managing storage space and memory data of the storage apparatus. However, when data is accessed via an FAT system, a next available cluster is first searched for with the aid of an FAT index table, which also needs to be updated. Under such a situation, a search time is different according to distribution (or a disk fragmentation) of used and available storage spaces of the storage apparatus. Generally speaking, the more dispersed the storage space is distributed, the longer the search time it takes. Moreover, the FAT index table is searched from a header every time the FAT index table is updated. Therefore, the time-consuming flow cannot meet read/write requirements of an apparatus (e.g., a personal video recorder (PVR)) which needs a fast data read/write speed.

In addition, certain environments supporting the FAT file system provide only one read or write authority to a same file at a time. Therefore, when a write operation is desired on a file which has just been read, the file needs to be first closed and then reopened to perform the write operation, and vice versa. However, according to the above approach, read/write efficiency of a storage apparatus using the FAT system is seriously insufficient.

Moreover, although in some technologies a new storage system is improved to address to the foregoing problem, a file generated in the new storage system is always faced with a compatibility problem that the file cannot be accessed by an FAT system, such that desires of users to implement the new storage system to store data are significantly reduced.

SUMMARY OF THE PRESENT DISCLOSURE

Therefore, one object of the present disclosure is to provide a file format converting method, so that stored files are accessible by other systems, e.g., an FAT file system, to solve the foregoing problems.

According to an embodiment of the present disclosure, a file format converting method for converting a first format file in a first file system in a storage apparatus to a second format file in a second file system is provided. The file formatting converting method comprises building a temporary file and defining a data amount of the temporary file as a first predetermined value; defining a start position of the temporary file to be the same as that of the first format file; and updating the data amount of the temporary file according to a data amount of the first format file to obtain the second format file.

According to another embodiment of the present disclosure, a file format converting method is provided. The file format converting method is for converting a second format file in a second file system (e.g., an FAT file system comprising an FAT) in a storage apparatus to a first format file in a first file system, which is structured on the second file system. The file format converting method comprises changing a data amount of the second format file in the FAT to a predetermined value; and creating the first format file in the FAT, such that a start position of the first format file in the storage apparatus is the same as that of the second format file.

From the above embodiments, an originally closed file system is converted to an FAT file system to increase convenience for data access.

DETAILED DESCRIPTION OF THE PREFERRED EMBODIMENT

In the known art, file allocation table (FAT) system applies an FAT index table (file allocation table) to manage a storage apparatus. Data may be dispersedly stored into a storage apparatus using the conventional FAT system, and the addresses at which the data are stored are recorded in the FAT index table, which will be looked up when accessing a desired data.

In an embodiment of the present disclosure, under the structure of FAT system, file allocation table (FAT index table) is formatted in advance so that storage space of a storage apparatus is divided into a plurality of data bulks in a way that the data bulks can be regarded as different storage units. And a data bulk index table is generated to build a data bulk system for managing the storage apparatus. In other words, the bulk index table is a storage unit index table of the data bulk system of the embodiment in the present disclosure.

Figure 1:
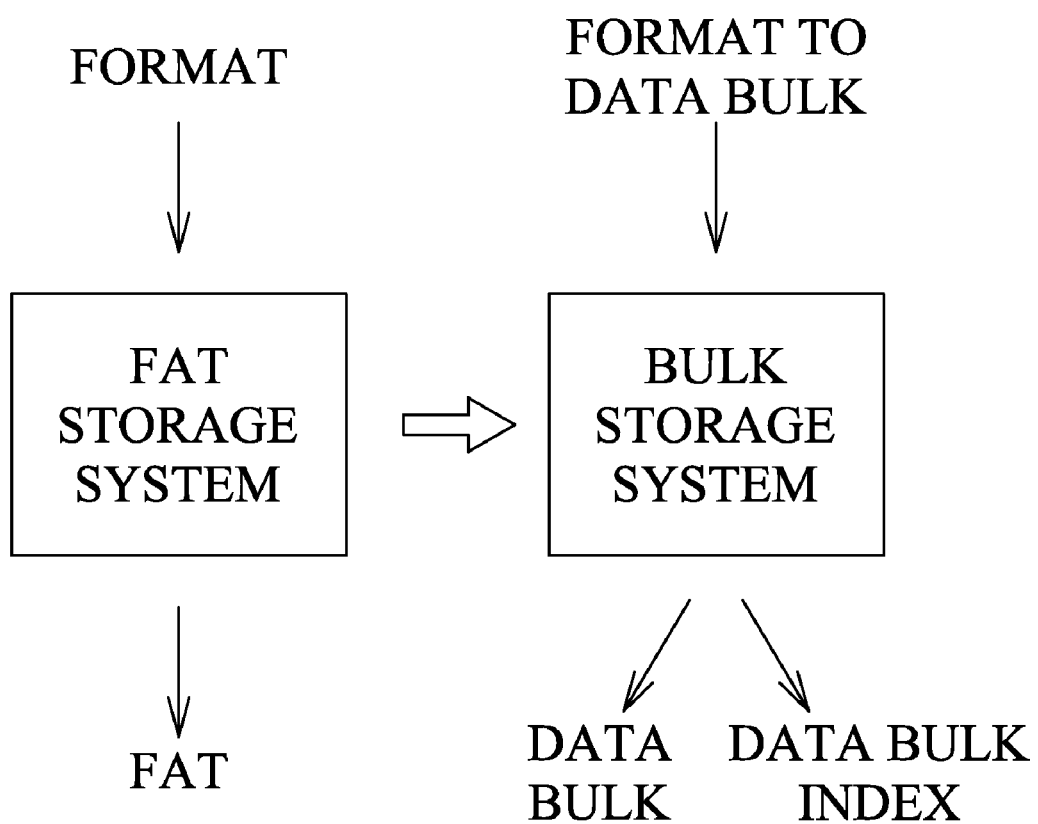
FIG. 1 is a conceptual diagram of converting an FAT system to a data bulk system.

In particular, in a file system converting method provided by the present disclosure, appropriate values are filled in advance into a FAT index table to establish a plurality of data bulks, each of which is regarded as a file in a FAT system. That is, in the file system converting method provided by the present disclosure, a plurality of files are established in advance in the FAT index table, and each of the files (each of the data bulks) is allocated to a predetermined storage space of the storage apparatus. Therefore, each of the data bulks is regarded as a storage unit. In an embodiment, the data bulks are consecutively distributed in the storage apparatus, and each of the data bulks has a same size, that is, each of the data bulks occupies a storage space of the same size. Although the plurality of files are established in the FAT index table, at the beginning, each of the files in fact does not have any corresponding data in the storage apparatus, i.e., the plurality of files are regarded as virtual files. For example, refer to FIG. 1 showing partial schematic diagram of the data bulks in the FAT index table of the present disclosure. This is achieved by formatting in advance the FAT index table to form a plurality of data bulks by implementing a file system converting method according to the present disclosure. A FAT index table 101, formatted to form a plurality of 64 Mb-sized data bulks, is for managing file data of a storage apparatus 103. After formatting the FAT index table, according to file system converting method of the present disclosure, the next step is generating a data bulk index table to record utilization conditions of the data bulks. The data bulks, the data bulk files and the data bulk index table are described below in detail.

Figure 2:
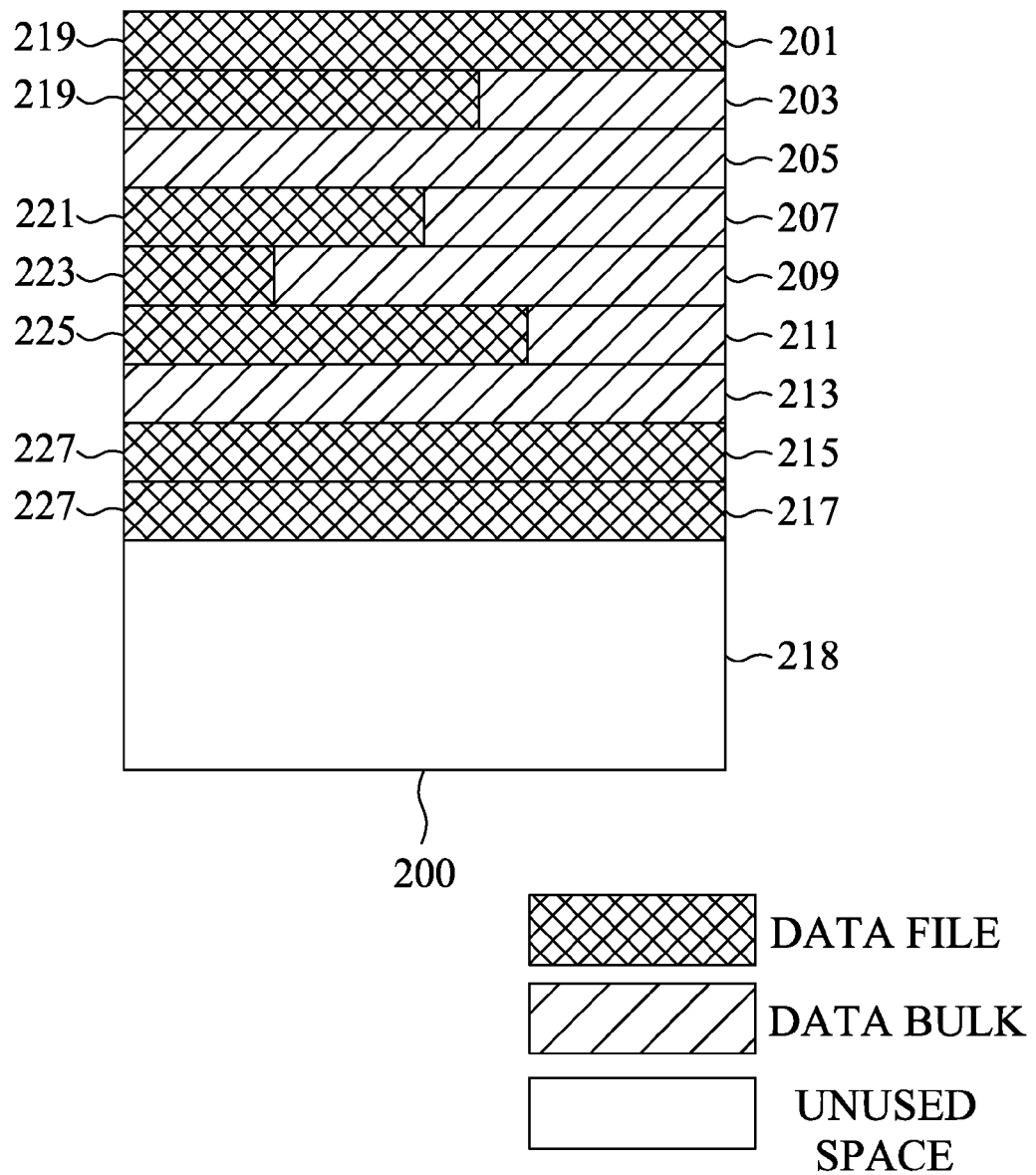
FIG. 2 is a schematic diagram of data files and data bulks of a data bulk system.

Refer to FIG. 2 showing a schematic diagram of data files and data bulks in accordance with an embodiment of the present disclosure. At least one part of a storage space 200 in a storage apparatus is divided into a plurality of storage units, e.g., data bulks 201 to 217; storage space 218 is an unoccupied storage space. The data bulks 201 to 217 are provided in different sizes according to different requirements. Data files 219, 221, 223, 225 and 227 are stored in the data bulks 201 to 217. More specifically, the data file 219 is stored in two consecutive data bulks 201 and 203, the data files 221, 223 and 225 are respectively stored in the data bulks 207 to 211, and the data file 227 is stored in two consecutive data bulks 215 and 217. Accordingly, when a data file needs to be stored in more than two data bulks, the data file is successively stored in two consecutive data bulks instead of being stored dispersedly in a conventional FAT system. Moreover, in the present disclosure, address associated information of the data file is stored in a data bulk index table (storage unit index table), when the file system of the present disclosure is about to access certain data file, it only needs to look up the address information in the data bulk index table instead of searching data files again and again located in dispersed blocks (in other words, searching for different addresses in the system) as what is done in the conventional FAT system. Therefore, the data file system of the present disclosure provides an increase read/write speed of the storage apparatus. In an embodiment, each of the data bulk stores a single data file, i.e., if a data bulk already stores a data file, the data bulk will not be used to store other data files even if this data bulk still has storage space available. When the size of a data file is greater than a capacity of one data bulk, the data file is stored into a plurality of consecutive data bulks.

Figure 3:
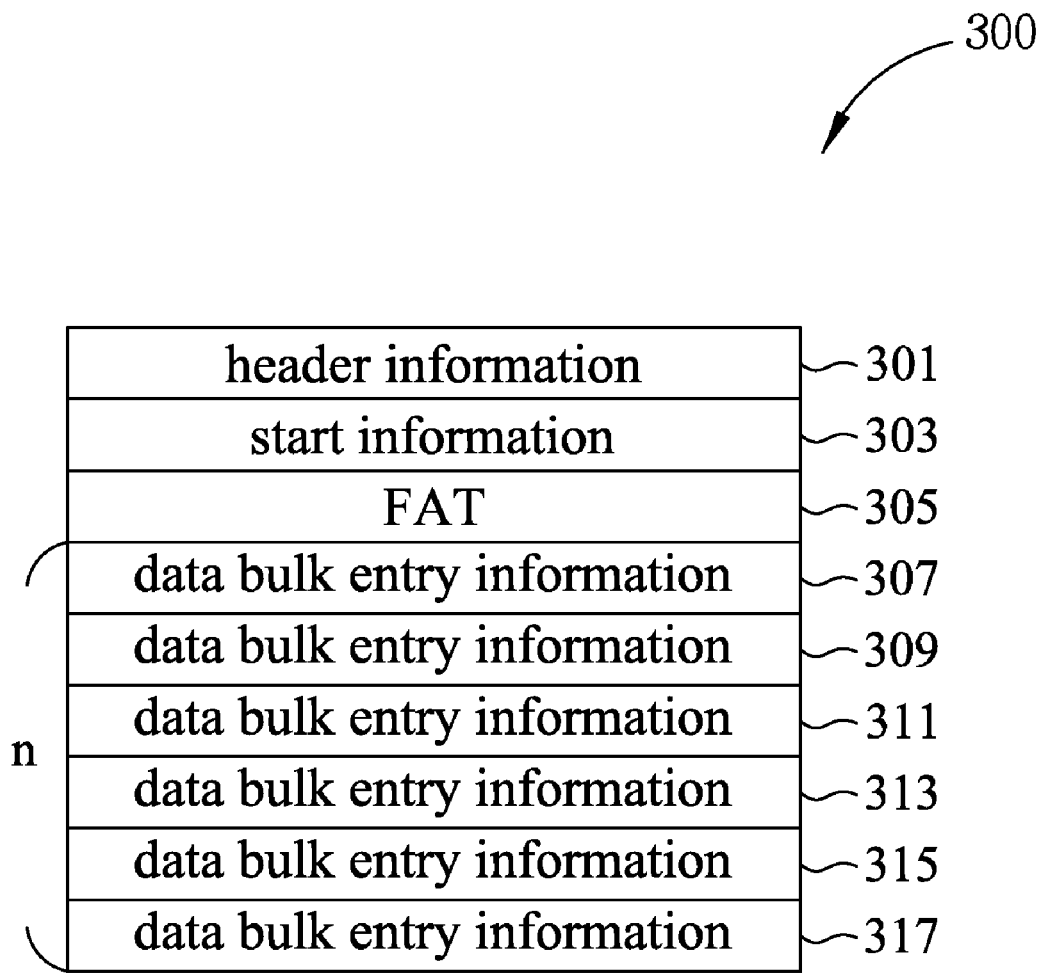
FIG. 3 is a schematic diagram of a data bulk index table of a data bulk system.
Figure 4:
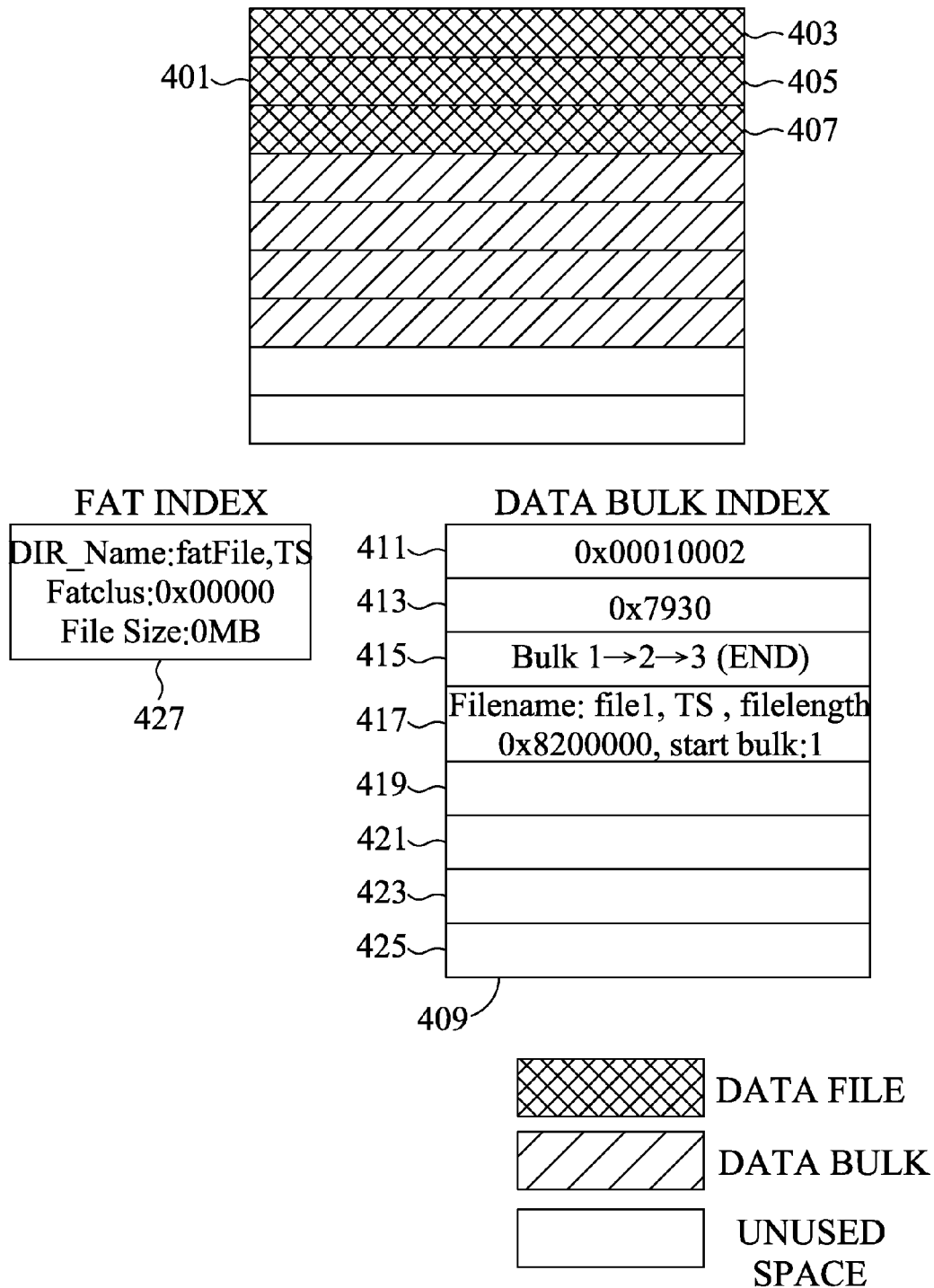
FIG. 4 to FIG. 7 are schematic diagrams of a file format converting method in accordance with an embodiment of the present disclosure.

Refer to FIG. 3 showing a schematic diagram of a data bulk index table 300 in accordance with an embodiment of the present disclosure. The data bulk table 300 comprises header information 301, a start information 303, an allocation table 305, and a plurality of data bulk entry information 307 to 317. In this embodiment, each part of the data bulk index table 300 (storage unit index table) is allocated to have a 4K space, and thus the whole data bulk index table 300 has a space of (3+N)*4K, where number 3 refers number of data bulks that header information 301, start information 303, and allocation table 305 occupy, and, N is number of data bulk entries each recording information of a data file stored in a data bulk. The header information 301 of data bulks is regarded as system information comprising various types of information of a data bulk system, e.g., a total number of data bulks of the data bulk system, a capacity of storage apparatus used by the data bulk system, number of data bulks already stored with data files, etc. The start information 303 records physical information of data bulks (storage units) in the storage apparatus, i.e., corresponding physical sector allocations of the storage apparatus of the data bulks (storage units) divided according to the embodiment of the present disclosure. For example, the start information 303 records the physical addresses of the start points of each of the data bulks in the storage apparatus; or, at which physical sector the data bulk starts.

The file allocation table 305, having associated information of the storage units and the data files, records correlations between the data bulks and the data files. For example, the file allocation table 305 records a data bulk or data bulks in which each of the data files is stored. Each of the data bulk entry information 307 to 317 records detailed information of the data file stored in that data bulk. For example, the data bulk entry information 307 to 317 respectively records identification code, file name, file length, operation mode, and the like, of the stored data file.

When a data file is accessed, the data bulk system supports at least two access parameters (e.g., a read pointer and a write pointer) to record an access position of the data file. For example, the read pointer and the write pointer are dynamically stored in the data bulk system, and the access parameters are updated according to a data amount of the data files to be accessed. In particular, before writing the data file, an absolute address (a physical address in the storage apparatus) of the data file is determined by a file search function and the access address of the data file, so as to write the data file into the storage apparatus. Such step is in brief described as Formula 1.

accessing sector(s)=data start sector+(data bit length/ bits per sector)     Formula 1:

"Sector" means the physical sectors in the storage apparatus. In short, Formula 1 represents that the data to be accessed can be located in the accessing sectors when the data start point and the length of data is provided. From the foregoing step, read and write sectors are calculated by Formula 2 and Formula 3.

read sector=read data start sector+(read data bit length/bits per sector)     Formula 2:

write sector=write data start sector+(write data bit length/bits per sector)     Formula 3:

According to the foregoing access operations, data file is directly accessed at an absolute position (physical address), instead of having to first search an FAT index to find a next available cluster as in a conventional FAT system, so that the access speed is accelerated. Further, the embodiments of the present disclosure are different from conventional FAT systems where only one read or write authority is provided to a same file at a time, and accordingly it is not necessary to continuously open or close the file, so that a time for accessing the file is reduced.

Refer to FIG. 4 to FIG. 7 showing schematic diagrams of a file format converting method in accordance with an embodiment of the present disclosure. In an embodiment in FIG. 4, a data file 401 is consecutively stored in data bulks 403, 405 and 407. A data bulk index table 409 comprises abovementioned header information 411, a start information 413, a file allocation table (FAT) 415, and a plurality of data bulk entry information 417 to 425. In an embodiment, the data bulk index table 409 is stored in one of the data bulks. In this embodiment, the data file 401 comprises a start address 0x7930 shown in the start information 413, and the data file 401 covers a first to a third data bulks named Bulks 1-3 (i.e., the data bulks 403, 405, and 407) in the FAT 415. As shown in the data bulk entry information 417, the data file 401 comprises a file name File1.TS, a file length 130 MB (0x8200000), and a start data bulk as the first data bulk. In order to access the data file 401 stored in a data bulk system by an FAT system, a temporary file (i.e., a virtual data unit) is first created in the FAT index table. Various types of parameters are shown in the temporary FAT index table 427 (the FAT index table in FIG. 4 only shows partial of the FAT index table in the FAT system), e.g., a file name, address of a start cluster, and a file size. In this embodiment, the file name of temporary file is fatFile1.TS, an initial address value of the start cluster is 0x00000 (i.e., 0), and an initial value of the file size is defined as 0. It is to be noted that, the initial values of the start cluster and the file size can be defined as values other than 0 in other embodiments.

Figure 5:
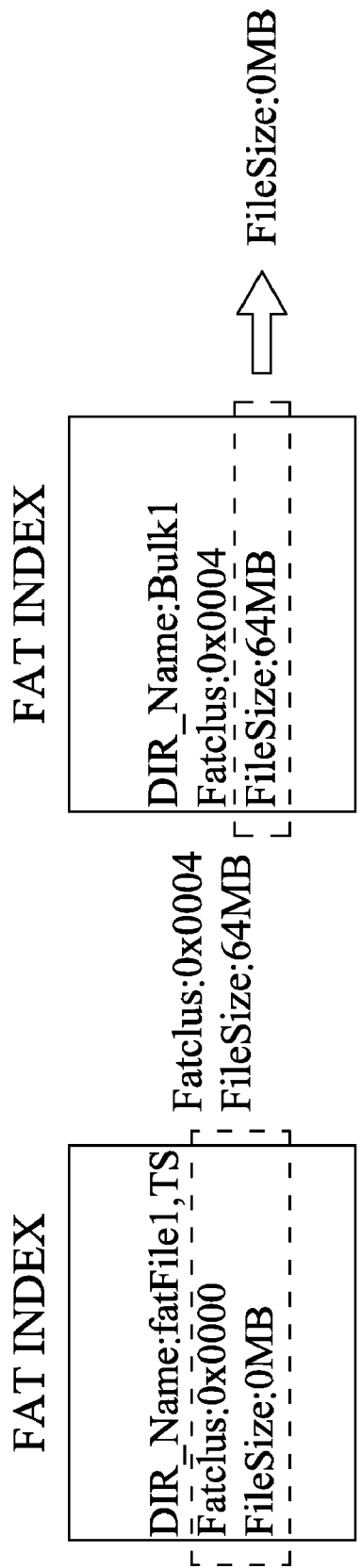

Next, the address of start cluster of the temporary file fatFile1.TS is defined to be the same as address of the first data bulk Bulk 1 (i.e., the data bulk 403 in FIG. 4) of the data file 401. That is, the temporary file fatFile1.TS and the first data bulk Bulk 1 point to the same position, also the file size of the temporary file fatFile1.Ts is defined to be the same as that of the first data bulk Bulk 1. Referring to FIG. 5, in this embodiment, the data bulk Bulk 1 has a start cluster located at address 0x0004, and a file size of 64 MB. A cluster represents one unit in the data bulk. Every cluster is allocated an address. Therefore, the address of start cluster of the temporary file fatFile1.Ts is accordingly changed to 0x0004, and the file size is changed to 64 MB. After that, the file size of the data bulk Bulk 1 is changed to 0. However, after such step is performed, if data file covers more than one data bulk, then the data file will not be able to be accessed because the system cannot figure the next data bulk which the data file continues. Accordingly an operation of connecting the plurality of data bulks is needed.

Figure 6:
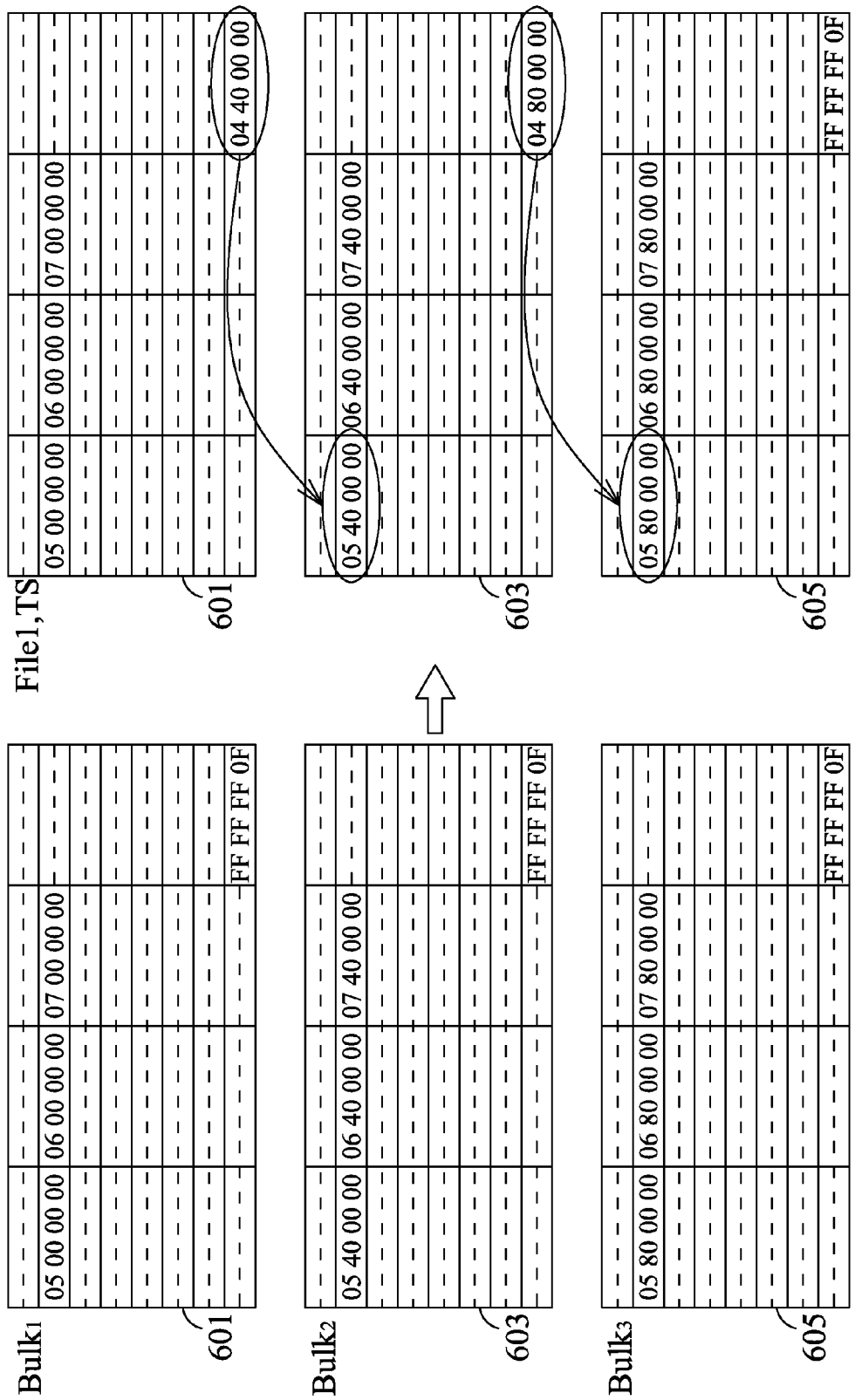

Refer to FIG. 6 showing the operation of connecting the plurality of data bulks from changing information of the data bulks. The information is recorded in the FAT index table. The left part of FIG. 6 shows information of original first, second and third data bulks 601, 603 and 605 in the FAT index table, and the original first, second and third data bulks 601, 603 and 605 respectively comprises a plurality of clusters. In each cluster parameter is provided to point to the next cluster to the present cluster. For example, if the address value of the present cluster is 0x00000005, the parameter will show that the next cluster begins at 0x00000006. As depicted in FIG. 6, the conventional first, second and third data bulks 601, 603 and 605, which are independent from one another, the end cluster of each data bulk has an address value of 0x0FFFFFFF.

However, at this point, although the start cluster of the virtual data unit which is defined the same as the first data bulk 601 and the file sizes of both are changed, only data of the first data bulk 601 is accessible via the temporary file fatFile1.TS; thus an address connecting operation is needed in order to access data of other data bulks (for the same data file). Referring to the right part of FIG. 6, as a schematic view, the end clusters of the first data bulk 601 and the second data bulk 603 are changed to point to a predetermined cluster of another data bulk. As shown, address of the end cluster (end position) of the first data bulk 601 is changed to 0x00004004, so that the parameter indicating the next cluster points to the start cluster (start position) of the second data bulk 603. Likewise, the end cluster of the second data bulk 603 is changed to 0x00008004, so that in the parameter indicating the next cluster points to the start cluster of the third data bulk 605. The end cluster of the third data bulk 605 comprises 0x0FFFFFFF marked as the end of the cluster, which means the data file ends here. To be noted, FIG. 6 only shows a schematic view; in one of the embodiments, the addresses of end clusters are modified in the allocation table. Accordingly, in this embodiment of the present disclosure, the first data bulk 601, the second data bulk 603, and the third data bulk 605 are connected, so that the data of the three data bulks are accessed by accessing the temporary file fatFile.TS. It is to be noted that, the foregoing parameters and allocation approach are taken as an example, and it shall not be construed as limiting the present disclosure. For example, the first cluster to the fourth cluster are for storing header guiding information, and thus the fifth cluster is the first cluster for recording data. However, when a conception of the present disclosure is to be applied to other systems except for the FAT system, a cluster allocation pattern and parameters may be different.

Figure 7:
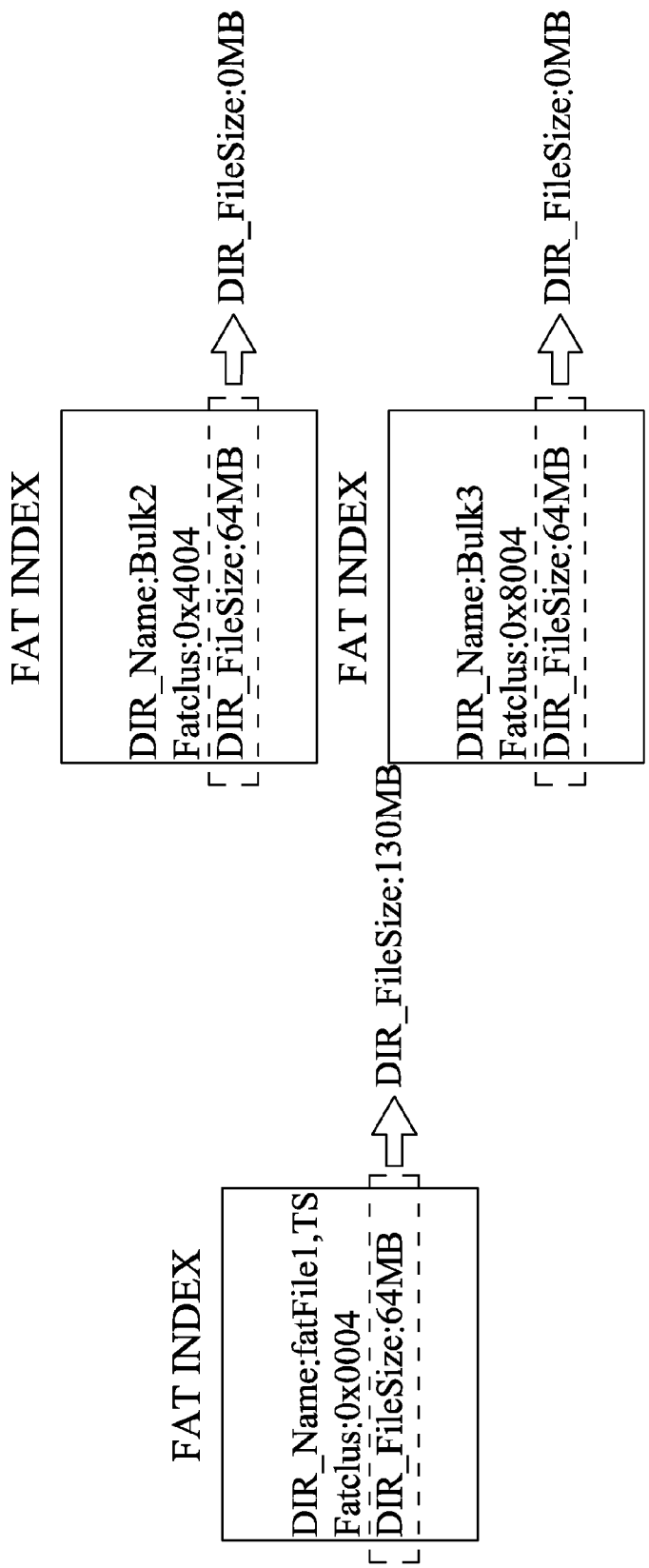

Please refer to FIG. 7, when the data bulks are connected, the size of the temporary file fatFile1.TS is changed to an overall data amount of the data file stored in these three data bulks (130 MB in this embodiment), and file sizes (in the FAT index) of the first data bulk Bulk 1, the second data bulk Bulk 2 and the third data bulk Bulk 3 are changed to 0. Reason for changing the sizes of the three data bulks to 0 is that the data of the data bulk neither needs to be duplicated to the temporary file fatFile1.TS nor occupies any storage space twice. When the sizes of the first data bulk Bulk 1, the second data bulk Bulk 2 and the third data bulk Bulk 3 are changed to values other than 0, the same result is also obtained. According to the foregoing steps, the temporary file fatFile1.TS is converted to an FAT file (i.e., a final converted file) which is accessible to an FAT system.

Figure 8:
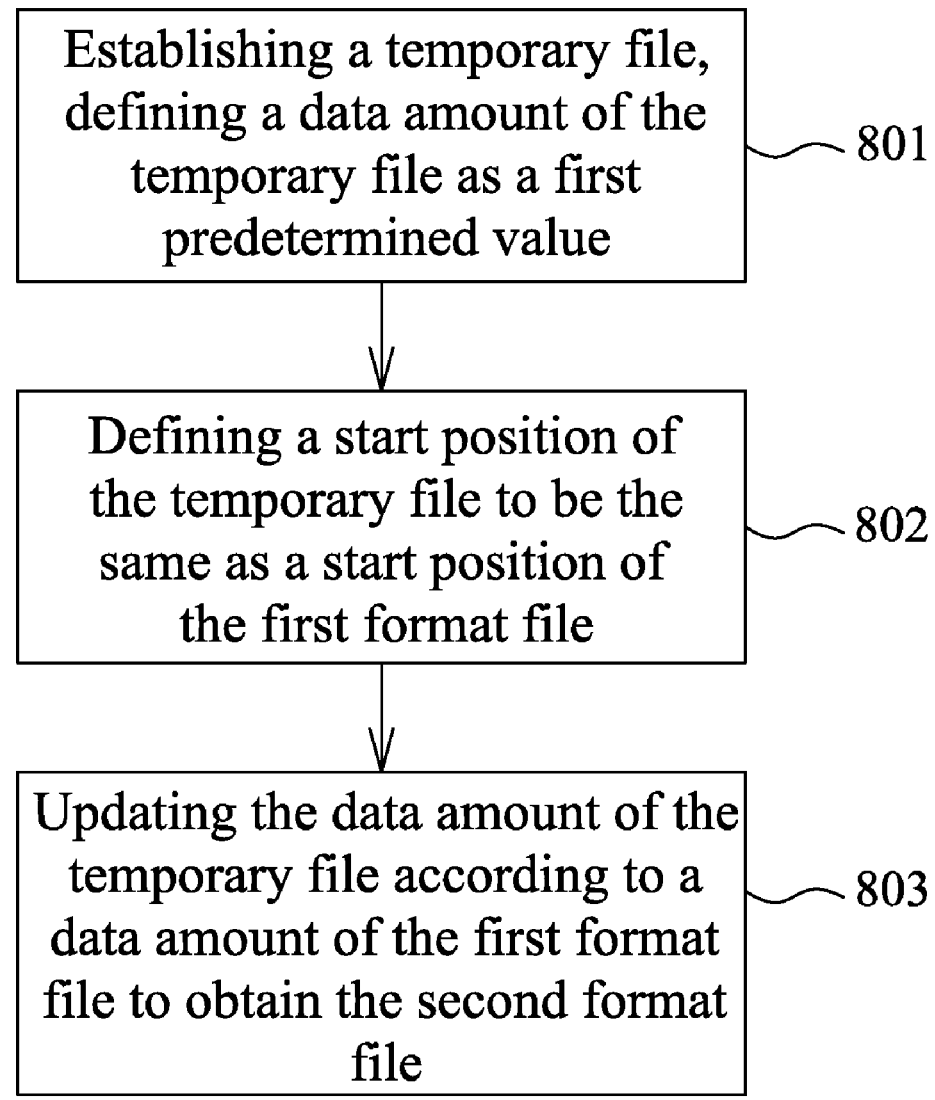
FIG. 8 is a flow chart of a file format converting method in accordance with an embodiment of the present disclosure.

Refer to FIG. 8 showing a flow chart of a file format converting method in accordance with an embodiment of the present disclosure. Cross reference FIG. 8 and the foregoing embodiments to gain a better understanding of the present disclosure. The flow in FIG. 8 comprises steps below.

In Step 801, it includes creating a temporary file (e.g., fatFile1.TS), and an initial value of a data amount of the temporary file is defined as a first predetermined value.

In Step 802, it includes marking start position of the temporary file the same as that of a first format file (e.g., a data file).

In Step 803, it includes marking the data amount (size) of the temporary file the same as that of the first format file, and at this point, the temporary file is converted to a second format file (an FAT file).

Other detailed characteristics are as disclosed in the foregoing embodiments, and shall not be further described for brevity. In an embodiment, the foregoing steps are realized by executing predetermined firmware or software with a control circuit (e.g., a processor); however, other circuit can also realize the foregoing steps.

When a converted second format file (i.e., the FAT file) is to be restored to a first format file (i.e., the bulk data file), the foregoing steps are performed in a reverse order. The temporary file is established, where it includes the information of second format file. Then data amount of the temporary file inside the conventional FAT index table is modified as 0. After that, the first format file corresponding to a data bulk file system is restored according to the bulk data index table (also referred as first file allocation table), such that the plurality of consecutive data bulks (storage units) can be mapped to the first format file. More specifically, this step can include restoring to the format compatible to the data bulk file system, which means end position of each of data bulks in the FAT index table is calculated and is filled with address 0x0FFFFFFF, for example. Also, the start position of the bulk data index table is modified as the start position of the second format file. Size of each of the data bulks in the FAT index is defined as a predetermined size of the data bulk file system. If file size of the second format file is greater than a storage capacity of one data bulk, it means the first format file after conversion corresponds to a plurality of consecutive data bulks. Therefore, the information about the consecutive data bulks is written in the bulk data index table.

From the above embodiments, an originally closed file system is converted to an FAT file system to increase convenience for data access.

While the present disclosure has been described in terms of what is presently considered to be the most practical and preferred embodiments, it is to be understood that the present disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A file format converting method for converting a first format file in a first file system to a second format file in a second file system in a storage apparatus, the file format converting method comprising:
   creating a temporary file, the temporary file having a temporary allocation table;
   defining a data size of the temporary file as a first predetermined value in the temporary allocation table;
   defining a start position of the temporary file in the temporary allocation table to be the same as a start position of the first format file;
   updating the data size of the temporary file in the temporary allocation table according to a data size of the first format file to obtain the second format file;
   dividing the storage apparatus in advance into a plurality of storage units before storing the first format file; and
   when the first format file is stored in a number of consecutive ones of the storage units, modifying information in at least one first file allocation table of the first format file, the information corresponding to the consecutive ones of the storage units of the first format files, such that the consecutive ones of the storage units are connected.

2. The file format converting method as claimed in claim 1, wherein creating the temporary file comprises setting the first predetermined value equal to zero.

3. The file format converting method as claimed in claim 1, further comprising:
   creating a storage unit index table that records information of the plurality of storage units.

4. The file format converting method as claimed in claim 3, wherein creating a storage unit index table comprises setting up at least one of header information, start information, correlation information, storage unit respective information in the storage unit index table, or a combination thereof.

5. The file format converting method as claimed in claim 1, wherein modifying information in the at least one first file allocation table comprises modifying an end position in the at least one first file allocation table to a desired value.

6. The file format converting method as claimed in claim 5, wherein the desired value is an indication of a start position of one of the storage units.

7. The file format converting method as claimed in claim 1, further comprising:
   changing the data size of the first format file in the first file allocation table to a second predetermined value.

8. The file format converting method as claimed in claim 7, wherein the second predetermined value is zero.

9. The file format converting method as claimed in claim 1, wherein the second file system is a file allocation table file system comprising a file allocation table (FAT).

10. The file format converting method as claimed in claim 9, wherein the first file system is structured on the second file system.

11. The file format converting method as claimed in claim 5, further comprising converting the second format file to the first format file, wherein the converting the second format file to the first format file comprises:
    modifying the data size of the temporary file in the temporary allocation table to a third predetermined value; and
    restoring the information in the first file allocation table, such that the consecutive ones of the storage units correspond to the first format file.

12. The file format converting method as claimed in claim 11, wherein the third predetermined value is zero.

13. The file format converting method as claimed in claim 11, wherein the restoring comprises:
    restoring the desired value to the end position in the at least one first file allocation table; and
    modifying a start position in the at least one first allocation table as the start position in the temporary allocation table.

14. The file format converting method as claimed in claim 11, further comprising deleting the temporary allocation table.

* * * * *